United States Patent
Arns

(10) Patent No.: US 7,077,442 B2
(45) Date of Patent: Jul. 18, 2006

(54) CRASH-BOX BUMPER MOUNT

(75) Inventor: Wilhelm Arns, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 11/084,837

(22) Filed: Mar. 17, 2005

(65) Prior Publication Data

US 2005/0206177 A1    Sep. 22, 2005

(30) Foreign Application Priority Data

Mar. 19, 2004   (DE) .......................... 10 2004 014 047

(51) Int. Cl.
   *B60R 19/26*    (2006.01)
(52) U.S. Cl. .................. 293/155; 293/132; 293/133; 296/187.03
(58) Field of Classification Search ............. 293/102, 293/132, 133, 155; 296/29, 187.01, 187.03, 296/187.09, 187.11
   See application file for complete search history.

(56) References Cited

U.S. PATENT DOCUMENTS

| 4,106,804 A | * | 8/1978 | Scrivo ..................... 293/109 |
| 4,778,208 A | * | 10/1988 | Lehr et al. ................. 293/133 |
| 4,826,226 A | * | 5/1989 | Klie et al. .................. 293/120 |
| 5,314,229 A | * | 5/1994 | Matuzawa et al. ...... 296/187.09 |
| 5,378,031 A | * | 1/1995 | Ohno et al. ................. 293/102 |
| 5,727,827 A | * | 3/1998 | Shibuya et al. ............. 293/155 |
| 5,803,514 A | * | 9/1998 | Shibuya et al. ............. 293/133 |
| 6,325,431 B1 | * | 12/2001 | Ito ............................. 293/102 |
| 6,364,384 B1 | * | 4/2002 | Kemp et al. ................. 293/120 |
| 6,520,552 B1 | * | 2/2003 | Schroter et al. ............. 293/132 |
| 6,554,333 B1 | * | 4/2003 | Shimotsu et al. ........... 293/132 |
| 6,779,821 B1 | * | 8/2004 | Hallergren .................. 293/133 |
| 6,814,381 B1 | * | 11/2004 | Frank ......................... 293/133 |
| 6,871,890 B1 | * | 3/2005 | Sato et al. ................... 293/155 |
| 6,918,621 B1 | * | 7/2005 | Seksaria ..................... 293/133 |
| 6,926,325 B1 | * | 8/2005 | Frank ......................... 293/133 |
| 6,929,297 B1 | * | 8/2005 | Muller et al. ............... 293/133 |
| 6,938,275 B1 | * | 9/2005 | Fried ............................ 2/162 |

FOREIGN PATENT DOCUMENTS

| DE | 198 20 433 | 11/1999 |
| DE | 100 57 311 | 5/2002 |
| JP | 6 211091 | 8/1994 |
| JP | 06211091 | * 8/1994 ................. 293/133 |

* cited by examiner

*Primary Examiner*—D. Glenn Dayoan
*Assistant Examiner*—Greg Blankenship
(74) *Attorney, Agent, or Firm*—Andrew Wilford

(57) ABSTRACT

A bumper assembly has a cross beam formed with an outer vertical web and two horizontal sides extending inward from upper and lower edges of the web, and two vehicle frame members having support ends spaced inward from and vertically offset from a center of the cross-beam web. Respective crash boxes each formed as a horizontally extending tube have an outer end engaging the bumper cross beam and an inner end fixed to the frame members. The outer ends of the crash boxes are vertically offset from the respective inner ends. The inner ends of the crash boxes bear outward generally only on the web and on one of the sides of the cross beam. The other of the sides of the cross beam is generally out of engagement with the crash boxes.

8 Claims, 2 Drawing Sheets

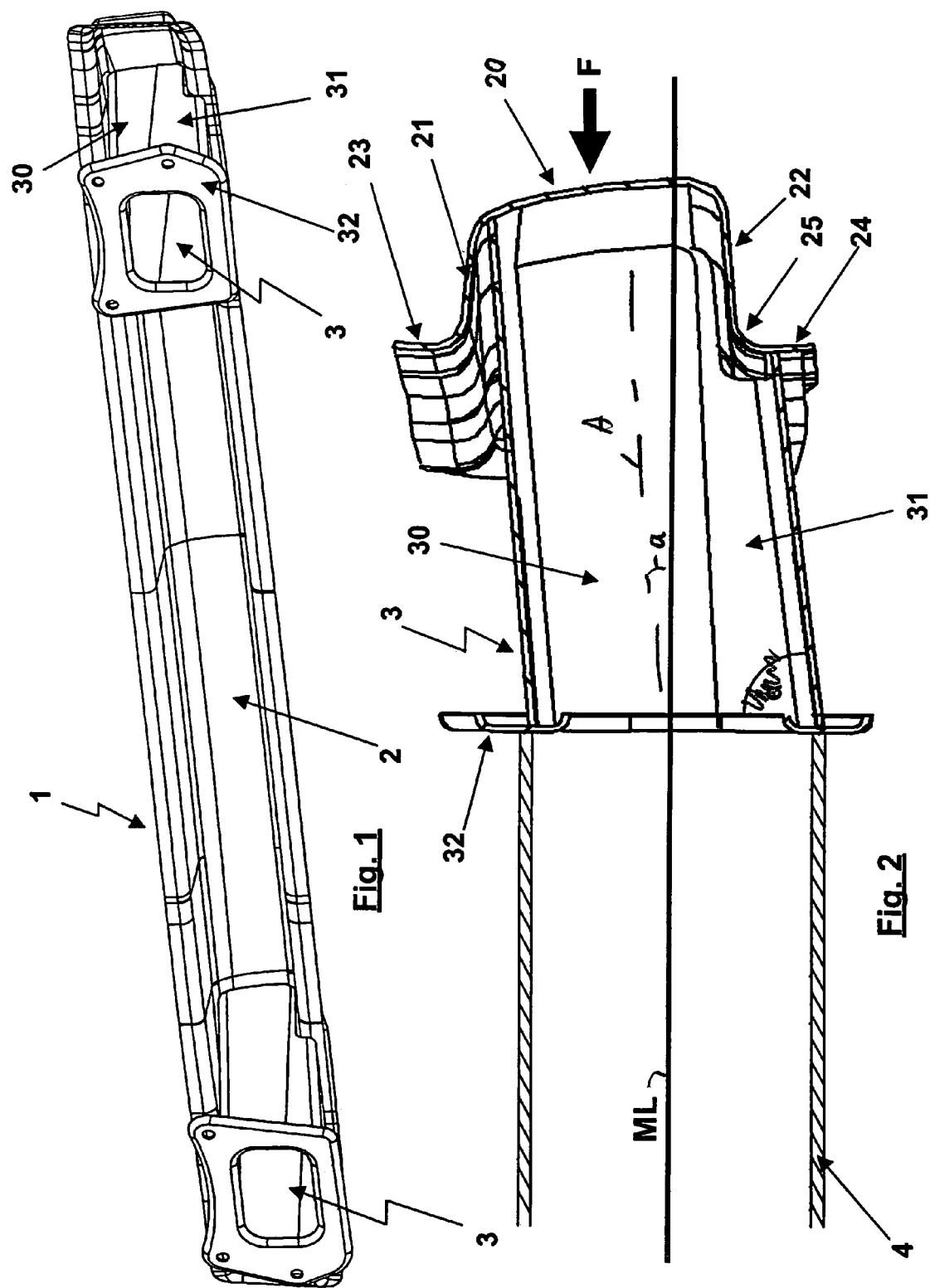

CRASH-BOX BUMPER MOUNT

FIELD OF THE INVENTION

The present invention relates to a bumper mount. More particularly this invention concerns a crash-box mount for an omega-section bumper.

BACKGROUND OF THE INVENTION

A standard motor-vehicle bumper has a cross-wise bumper beam of omega section, that is having a normally vertical front web, upper and lower horizontal sides projecting inward toward the vehicle from upper and lower edges of the front web, and upper and lower flanges projecting upward and downward from inner edges of the sides. Such a cross beam is supported on the vehicle frame by at least two crash boxes each formed as a short horizontally extending tube having an outer end fixed to the cross beam and an inner end fixed to the vehicle frame, normally at a longitudinal rail. Thus in an accident the cross beam will be pushed back, crushing the crash boxes inward against the vehicle frame and thereby localizing damage to the crash boxes. Such a system is therefore intended to stop the vehicle in a low-speed 16 km/hr collision without significant damage to the vehicle frame or injury to its occupants, as crushing of the sacrificial crash boxes absorbs most of the energy of the collision.

It is often necessary as described in German 198 20 433 of R. Bruck, U.S. Pat. No. 6,364,384, and Japanese 6-211 091 for the crash box to also serve as an adapter to compensate for a difference in height between that of the vehicle frame, to which it must be centrally connected, and the bumper cross beam, whose height above the ground lies within a certain statutory range but may vary up or down somewhat for design considerations. Thus the inner end, that is the end secured to the vehicle frame, and the outer end of the crash boxes are often vertically offset from one another so that the bumper cross beam can be positioned above or below the center of the frame member to which the inner crash-box end is fixed.

A typical crash box is formed as described in German 100 57 311 of two squared-off U-section profiles that fit vertically together to form a rectangular tube. The box inner end is provided with a peripheral flange by means of which it is bolted to the vehicle frame. Such construction is a particular problem when the inner and outer ends are vertically offset as in a collision the horizontally applied force exerts a torque or twisting action on the crash boxes. The result is a lateral bending of the crash boxes instead of the desired crushing deformation, so that they absorb considerable less energy. Alternately the result is a twisting deformation of the vehicle frame, a part that the sacrificial crash box is supposed to protect.

OBJECTS OF THE INVENTION

It is therefore an object of the present invention to provide an improved crash-box bumper mount.

Another object is the provision of such an improved crash-box bumper mount that overcomes the above-given disadvantages, in particular that is highly effective at absorbing energy when its inner and outer ends are vertically offset from one another.

SUMMARY OF THE INVENTION

A bumper assembly has according to the invention a bumper cross beam unitarily formed with an outer generally vertical web and two generally horizontal sides extending inward from upper and lower edges of the web, and two vehicle frame members having support ends spaced inward from and vertically offset from a center of the cross-beam web. Respective crash boxes each formed as a horizontally extending tube have an outer end engaging the bumper cross beam and an inner end fixed to the frame members. The outer ends of the crash boxes are vertically offset from the respective inner ends such that the crash boxes extend at a small acute angle to a horizontal central plane of the frame. The inner ends of the crash boxes bear outward generally only on the web and on one of the sides of the cross beam. The other of the sides of the cross beam is generally out of engagement with the crash boxes. The outer crash-box ends can be above or below their inner ends.

Thus in a collision the forces effective against the bumper will be absorbed primarily in line with the vehicle frame and will crush the crash boxes uniformly, not twist or bend them. The offset of the outer ends of the crash boxes in the bumper beam ensures that most forces are redirected along the centerline of the frame member to which it is attached.

In accordance with the invention each crash box has an upper downwardly open U-section element having an inner end and an outer end, a lower upwardly open U-section element vertically interfitted and joined with the upper element and also having an inner end and an outer end, and a flange fixed between the inner ends and the frame. One of the outer ends bears outward substantially only on the web and the other of the outer ends bears outward on the web and on the one side. The element having the other outer end, that is the element bearing on the side also, is substantially stronger than the element having the one outer end. This effect can be achieved by simply making the stronger element of thicker metal. In a one-piece crash box, the portion that needs to be stronger can similarly be made of thicker metal or can be treated to be stronger.

The cross beam according to the invention has a generally closed profile. In addition the cross-beam sides include upper and lower flanges extending upward and downward. The other outer end bears outward on the flange of the one side and is cut away at its outer end to fit with the one side.

BRIEF DESCRIPTION OF THE DRAWING

The above and other objects, features, and advantages will become more readily apparent from the following description, reference being made to the accompanying drawing in which:

FIG. 1 is a perspective view of a pair of crash boxes and a bumper cross beam according to the invention;

FIG. 2 is a longitudinal section through one of the crash boxes, part of the vehicle frame, and the bumper beam.

SPECIFIC DESCRIPTION

Figures 3A, 3B, 3C:
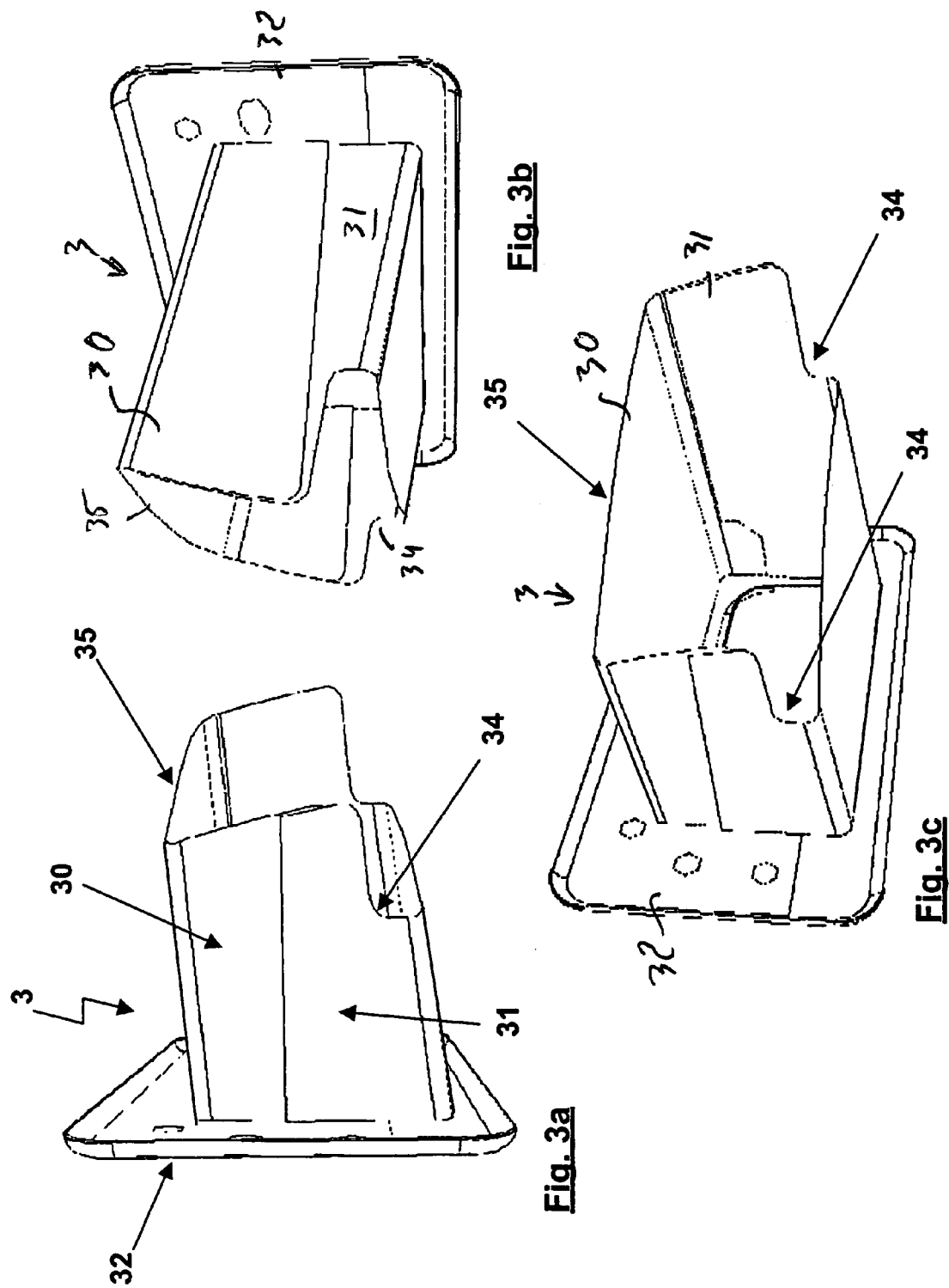
FIGS. 3a, 3b, and 3c are perspective views of a crash box in accordance with the invention.

As seen in FIGS. 1 and 2 a bumper assembly 1 according to the invention basically comprises a hat- or omega-section bumper cross beam 2, a pair of identical crash boxes 3, and a vehicle frame having two longitudinal rail members 4 each aligned with a respective one of the boxes 3. All the parts are of metal, although it is known for the cross beam 2 to be at least partially made of plastic, and this beam 2 is often covered with a thin plastic fascia serving mainly decorative purposes.

The bumper beam 2 is formed as one piece and has a vertical front web 20 from the upper and lower edges of which extend a pair of generally horizontal and generally flat and planar sides 21 and 22, projecting rearward in a front bumper and forward in a rear bumper. Flat flanges 23 and 24 extend upward and downward from the inner edges of the upper and lower sides 21. As shown in FIG. 2 most of bumper beam 2 lies above a central axis or plane ML of the frame members 4. It is essential, however, that any forces such as indicated at F be transmitted to these members 4 centrally and in line with the axes ML.

According to the invention as also shown in FIGS. 3a–3c each of the crash boxes 3 is formed by an upper and downwardly open U-section element 30 and by a lower and upwardly open U-section element 31 vertically interfitted with and overlapping the upper element 30. Both the elements 30 and 31 extend parallel to an axis A forming a small acute angle a with the frame axis/plane ML. At their rear ends, both elements 30 and 31 are fixed to an annular flange 32 that is bolted to the vehicle frame having the members 4. The overlapping vertical sides of the members 30 and 31 are welded together to form a rectangular-section tube.

The outer end of the upper element 30 bears axially at a front edge 35 of the box 3 outward against the web 20 of the bumper beam 20 and is in fact wholly out of contact with the sides 21 and 22. The outer edge 35 of the element 31 is, however, formed with a cutout 34 that fits at a corner 25 between the side 22 and the flange 24 so that this outer end bears outward against the lower portion of the web 20, the side 22, and the flange 24.

Furthermore according to the invention the lower element 31 is built, for example by making it of thicker or stronger metal, so that it is more resistant to crushing, that is stronger, than the upper element 30. As a result in a crash when a force F is exerted backward on the beam 2 parallel to the plane/axis ML, the crash boxes 3 will crush uniformly backward without twisting or canting.

In the illustrated embodiment the outer ends, that is the front ends in a front bumper and the rear ends in a rear bumper, of the crash boxes 3 are above their rear ends, but it would equally possible for the outer ends to be below the rear ends. This orientation is a function of where the bumper lies relative to the vehicle frame.

I claim:

1. A bumper assembly comprising:
   a bumper cross beam unitarily formed with an outer generally vertical web and two generally horizontal sides extending inward from upper and lower edges of the web;
   two vehicle frame members having support ends spaced inward from and vertically offset from a center of the cross-beam web; and
   respective crash boxes each formed as a horizontally extending tube having an outer end engaging the bumper cross beam and an inner end fixed to and bearing inward on the respective frame member, the outer ends of the crash boxes being vertically offset from the respective inner ends such that the crash boxes extend at a small acute angle to a horizontal central plane of the frame members, the outer ends of the crash boxes bearing outward generally only on the web and on one of the sides of the cross beam, the other of the sides of the cross beam being generally out of engagement with the crash boxes, the crash boxes being substantially out of contact with the members and with the web except at the respective inner and outer ends.

2. The bumper assembly defined in claim 1 wherein each crash box has
   an upper downwardly open U-section element having an inner end and an outer end,
   a lower upwardly open U-section element vertically interfitted and joined with the upper element and also having an inner end and an outer end, and
   a flange fixed between the inner ends and the respective frame members, one of the outer ends bearing outward substantially only on the web and the other of the outer ends bearing outward on the web and on the one side.

3. The bumper assembly defined in claim 2 wherein the element having the other outer end is substantially stronger than the element having the one outer end.

4. The bumper assembly defined in claim 1 wherein the cross-beam sides include
   upper and lower flanges extending upward and downward, the other outer end bearing outward on the flange of the one side.

5. The bumper assembly defined in claim 2 wherein the other outer element is cut away at its outer end to fit with the one side.

6. A bumper assembly comprising:
   a bumper cross beam unitarily formed with an outer generally vertical web and two generally horizontal sides extending inward from upper and lower edges of the web;
   two horizontally spaced vehicle frame members having support ends spaced inward from and vertically offset from a center of the cross-beam web; and
   respective horizontally spaced crash boxes each formed as a horizontally extending tube centered on an axis and having an outer end engaging the bumper cross beam and an inwardly directed inner end fixed to and bearing inward on the respective frame member, the outer ends of the crash boxes being vertically offset from the respective inner ends such that the axes of the crash boxes extend at a small acute angle to a horizontal central plane of the frame members, the outer ends of the crash boxes bearing outward generally only on the web and on one of the sides of the cross beam, the other of the sides of the cross beam being generally out of engagement with the crash boxes, the crash boxes being substantially out of contact with the respective frame members and web except at the respective inner and outer ends.

7. The bumper assembly defined in claim 6 wherein the crash boxes are each formed by a pair of joined-together U-section parts that extend substantially parallel to each other and to the respective axis.

8. The bumper assembly defined in claim 6, further comprising
   respective flanges fixed between the inner ends of the crash boxes and the respective frame member.

* * * * *